(12) United States Patent
Villagran et al.

(10) Patent No.: US 7,482,033 B2
(45) Date of Patent: *Jan. 27, 2009

(54) FABRICATED POTATO CHIP

(75) Inventors: Maria Dolores Martines-Serna Villagran, West Chester, OH (US); David John Beverly, Jackson, TN (US); Leonard Williamson, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/441,608

(22) Filed: May 26, 2006

(65) Prior Publication Data

US 2006/0216398 A1     Sep. 28, 2006

Related U.S. Application Data

(62) Division of application No. 08/886,381, filed on Jul. 1, 1997, now Pat. No. 6,066,353.

(60) Provisional application No. 60/022,521, filed on Jul. 1, 1996, provisional application No. 60/020,936, filed on Jul. 1, 1996.

(51) Int. Cl.
    *A23L 1/2165* (2006.01)
(52) U.S. Cl. ...................................................... 426/637
(58) Field of Classification Search ................. 426/637
    See application file for complete search history.

(56) References Cited

U.S. PATENT DOCUMENTS 3,997,684 A * 12/1976 Willard ....................... 426/550
3,998,975 A * 12/1976 Liepa .......................... 426/550
5,690,982 A * 11/1997 Fazzolare et al. ............ 426/550

\* cited by examiner

*Primary Examiner*—Arthur L Corbin
(74) *Attorney, Agent, or Firm*—Adam W. Borgman; Kim William Zerby; Steven W. Miller (57) ABSTRACT

Dehydrated potato flakes prepared from potato slices, slivers and/or nubbins suitable for use in dough compositions used to make fabricated products. The dehydrated flakes are prepared such that the physical properties in the flake are controlled during processing. The resulting flakes can be used to prepare a more cohesive, non-adhesive, machineable dough.

18 Claims, 5 Drawing Sheets

FABRICATED POTATO CHIP

CROSS REFERENCE TO RELATED APPLICATIONS

This application is a divisional application of U.S. application Ser. No. 08/886,381, filed Jul. 1, 1997 (now U.S. Pat. No. 6,066,353) which claims the benefit of U.S. Provisional Application No. 60/022,521, filed Jul. 1, 1996 and U.S. Provisional Application No. 60/020,936, filed Jul. 1, 1996.

TECHNICAL FIELD

This invention relates to dehydrated potato flakes and to a method of preparing dehydrated potato flakes.

BACKGROUND OF THE INVENTION

Fabricated farinaceous products prepared from starch-based flours are well known in the art. Preparing such products from dehydrated ingredients offers certain advantages such as homogeneity, uniformity and control of the end product. The food processor encounters several problems when formulating doughs used to prepare such products. For example, although a cohesive sheetable dough may be formed, the dough typically falls apart or tears when sheeted at high speeds. Additionally, variability in the physical properties of the dehydrated ingredients, in particular the flakes, often produces doughs that are sticky, tacky or gummy. This often leads to down time on processing lines and additional ingredient costs.

There are several problems associated with the physical properties of conventional potato flakes and with the processes used to make such flakes. One significant problem with conventional flakes is related to the variability in the physical properties of the flakes produced from potatoes. These variations are influenced by many factors such as types of potatoes used to make the flakes, the season in which the potatoes are grown, when the potatoes are harvested, the area where the potatoes are grown, and the length of time the potatoes are stored. These variations, up to now, have resulted in large variability between flake lots made from the potatoes.

The physical properties necessary in a flake used to formulate a dough for making fabricated farinaceous products have gone unrecognized or unappreciated. While conventional processes try to minimize broken cells, it has been found that flakes comprising from about 40% to about 60% broken cells are desirable from a sheeting standpoint. Further, it has been found that controlling the difference between hot paste viscosity and cold paste viscosity improves processability, even though conventional processes do not place any importance on this particular physical property. It has also been found that a low water absorption is desirable in a flake used for making a dough. While conventional processes suggest a high water absorption index is desirable.

Conventional methods for processing potatoes into dehydrated products have not allowed potato processors to produce suitable flakes from potatoes of different variety, different compositions or from potato by-products (e.g., potato pieces left over from French fry processes) or potatoes from the beginning and end of season. Even when the same variety of potatoes are used, there is an inability to consistently control the physical properties of the flakes by processing.

Several processes for making dehydrated potato flakes are disclosed in U.S. Pat. No. 2,787,533 issued to Cording et al., U.S. Pat. No. 3,009,817 issued to Hendel, and U.S. Pat. No. 3,968,260 issued to Shatilla et al. These patents disclose a process for preparing flakes from raw whole potatoes or conventional potato flakes but not from slivers and nubbins. Further, these processes provide very few, if any, special measures that are designed to assure limited variability in the physical properties of flakes. For example, prior to being cooked, the potatoes are often pre-conditioned. The blanching toughens the potato cells, requires more energy to thoroughly cook the potatoes and makes uniform cooking of the potato pieces difficult. Additionally, the sequence of blanching, cooling, and cooking, as suggested by many processes, increases retrogradation of starch and restricts the release of amylose and/or causes complexation of the free starch needed to form a cohesive machineable dough sheet. Moreover, cooking at high temperatures and/or high steam pressures for short times or even at 212° F. (100° C.) for short times can result in potato flakes that are under-cooked (e.g. raw or cooked on the outer surface) or over-cooked (e.g. having weak, swollen cells that will rupture during subsequent processing).

One process disclosed in U.S. Pat. No. 4,241,094 issued to O'Neal, makes dehydrated flakes by separating potatoes into two groups during the initial processing. Later the two groups of flakes are blended to make dehydrated flakes, which have a texture and quality similar to freshly prepared mashed potatoes when reconstituted. According to the O'Neal patent, potato flakes made from mash having free starch throughout are pasty and undesirable. Further, retrogradation of starch is encouraged. Although the flakes may be suitable for the consumer to prepare mashed potatoes, the potato flakes, due to their low level of free starch (amylose) and high water absorption index, are not desirable for the production of doughs from which fabricated farinaceous products are made.

It can be seen that conventional processes are unsatisfactory for making or providing dehydrated flakes having desirable properties.

A need exists for potato flakes made from various potatoes and potato by-products. Another need exists for potato flakes having controlled physical properties that are suitable for use in making farinaceous fabricated products. Further, a need exists for potato flakes and for a method of producing potato flakes wherein the differences in performance from lot to lot is minimized.

Accordingly, it is an object of the present invention to provide a process for making dehydrated potato flakes.

It is another object of the present invention to provide potato flakes particularly suitable for doughs used to make fabricated farinaceous products.

It is further an object of the present invention to provide potato flakes having substantially improved processing qualities over conventionally-produced flakes.

These and other objects of the invention will become apparent from the following disclosure and claims.

SUMMARY OF THE INVENTION

The present invention relates to dehydrated potato flakes that can be prepared from potato slices, slivers and/or nubbins. The present invention further relates to a process for producing potato flakes wherein the cooking cycle, during processing of the potato flakes, is controlled.

The process of the present invention is advantageous over processes in that it allows the potato flake processor to produce flakes from potatoes of different varieties and compositions and additionally to reduce the variability in the physical properties of the flakes produced from potatoes of different varieties and compositions. It further allows the flake producer to use slivers and nubbins, which were once thought to be unsuitable for use in the flaking process.

Use of the dehydrated flakes in the formulation of fabricated farinaceous products increases efficiency and allows the food processor to control the texture of the dough as well as the texture of the ready-to-eat product.

In addition, the present invention relates to a dough containing the dehydrated potato flakes. The dough has increased sheet strength and can be used to prepare farinaceous fabricated food products.

DETAILED DESCRIPTION

Definitions

As used herein, the term "slivers" refers to thin sliced potato pieces that are separated from the products after the potato is cut into French fry strips. These pieces are generally the by-products from the length portion of the French fry strip and are typically shorter than the French fry itself.

As used herein the term "nubbins" refers to short or broken potato pieces that are separated from the potato after it is cut into French fry strips. These pieces are generally the by-products from the end portions of the French fry strip.

As used herein, "Brabender Units (BU)" is an arbitrary unit of viscosity measurement roughly corresponding to centipoise.

As used herein, the term "fabricated farinaceous products" refers to food products made from doughs that contain flour, meal or starch derived from tubers and/or grains.

As used herein "sheetable dough" is a dough capable of being placed on a smooth surface and rolled to the desired final thickness without tearing or forming holes.

As used herein "starch-based materials" refer to naturally occuring, high polymeric carbohydrates composed of glucopyranose units, in either natural, dehydrated (e.g., flakes, granules, meal) or flour form. The starch-based materials include, but are not limited to, potato flour, potato granules, corn flour, masa corn flour, corn grits, corn meal, rice flour, tapioca, buckwheat flour, rice flour, oat flour, bean flour, barley flour, tapioca, as well as modified starches, native starches, and dehydrated starches, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, cornstarch, oat starch, cassava starch, rice starch, wheat starch, and mixtures thereof.

As used herein "Brabender Units (BU)" is an arbitrary unit of viscosity measurement roughly corresponding to centipoise.

As used herein, "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

As used herein, the term "added water" refers to water which has been added to the dry dough ingredients. Water which is inherently present in the dry dough ingredients, such as in the case of the sources of flour and starches, is not included in the added water.

All percentages are by weight unless otherwise specified.

The present invention relates to a dehydrated potato flake having certain physical properties. Sheet strength, water absorption and stickiness of the dough can be controlled by the addition of the dehydrated flakes to the dough. Controlling the physical properties of the flakes allows one to also control the texture and fat content of the ready-to-eat fabricated farinaceous product without adding additional ingredients (e.g., fibers, gums).

Any commercially-available potato used to prepare flakes can be used to prepare the dehydrated flakes of the present invention. Preferably, the flakes are prepared from potatoes such as, but not limited, to Kennebec, Russet Burbank, Idaho Russet, Sebago, Bentgie, Aurora, Saturna, and Mentor. Raw or pre-conditioned potato slices, nubbins and slivers or mixtures thereof can be used in the practice of the present invention. Typically, the nubbins and slivers will be pre-conditioned since they are by-products of a standard French fry making process. The potato flakes can be made using standard potato flake-making equipment, such as a twin or single screw cooker.

Potato pieces, as used herein "potato pieces" refer to potato by-products, e.g. slivers, nubbins, or slabs can be used in the practice of the present invention. In one preferred embodiment, raw potatoes are peeled by steam and then inspected to remove defective potatoes. The peeling can be accomplished by lye, steam, or abrasion. The peeled potatoes are sliced to a thickness of from about 0.25 to about 0.75 inches, preferably from about 0.3 to about 0.7 inches and more preferably from about 0.35 to about 0.65 inches (hereinafter referred to as "slabs").

Figure 3:
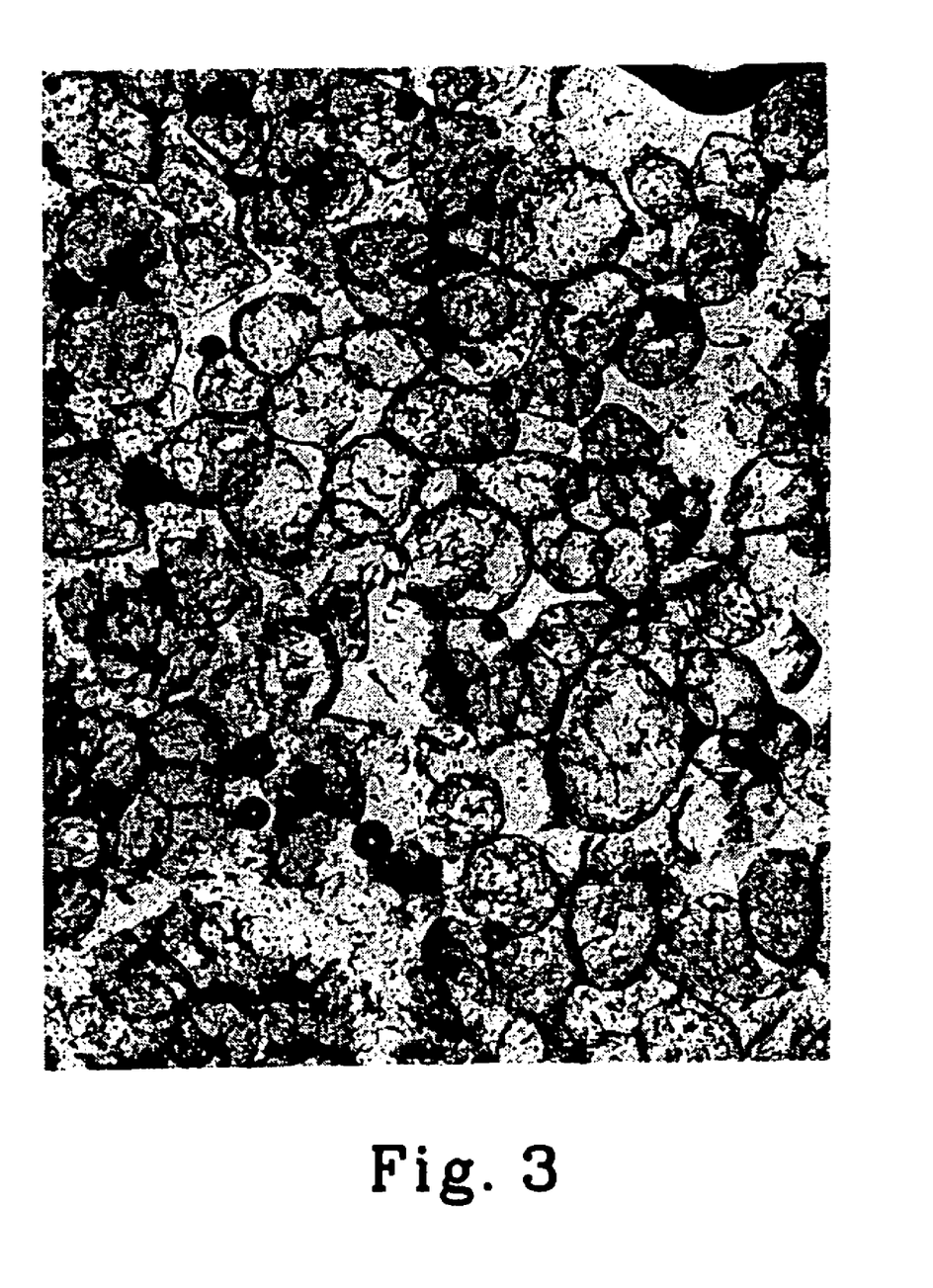
FIG. 3 is a photomicrograph magnification 64× of potato cells in flakes made according to the present invention.
Figure 4:
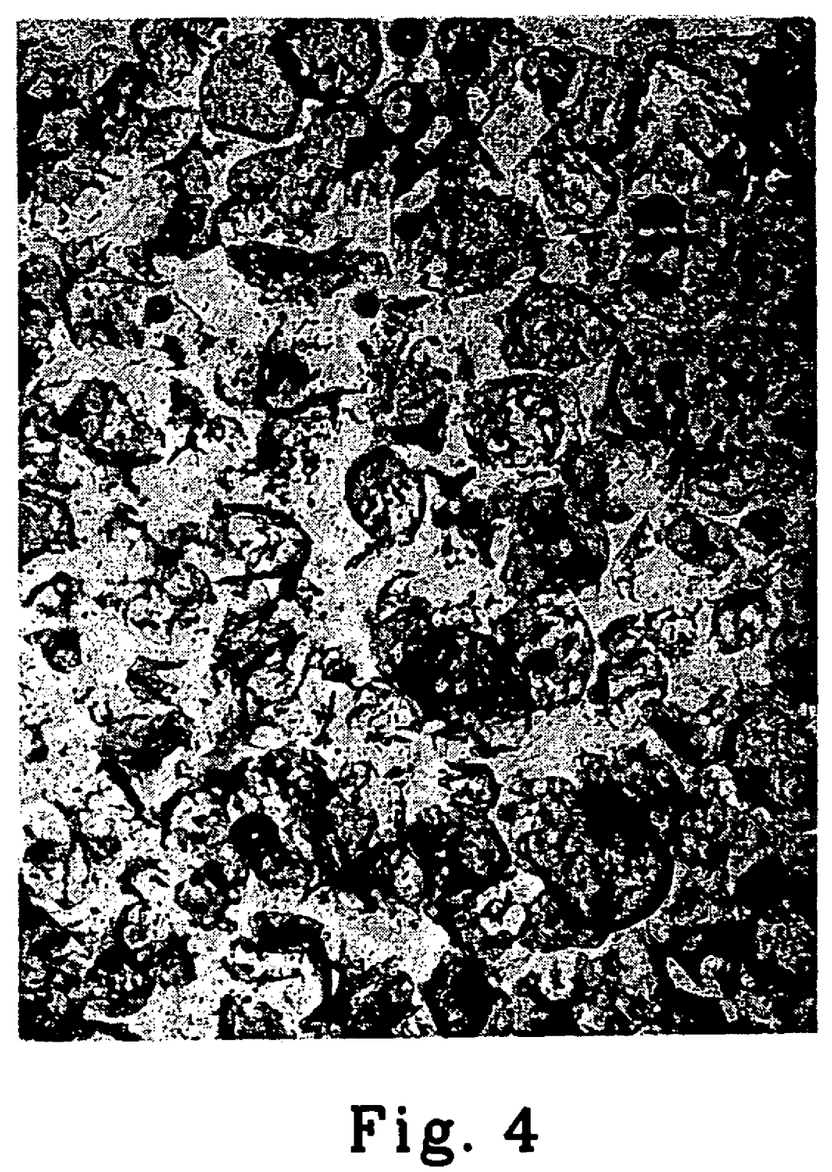
FIG. 4 is a photomicrograph magnification 64× of potato cells in flakes made according to conventional methods.

Next the raw potato pieces/slabs are cooked under atmospheric pressure using steam typically having a pressure of about 2 to about 20 psig (pounds per square inch gauge), preferably from about 5 to about 18 psig, and more preferably from about 10 to about 15 psig. The cooking process is critical to obtaining the desired potato flake. The length of time to conduct the steaming and the cooking is, of course, dependent upon the volume capacity of the vessel, the steam generator output, and the amount of potato pieces/slabs being cooked. Preferably the temperature of the potato slab/pieces rises from about 65° F. (18° C.) to about 212° F. (79° C.) during the first one-third of the cooking cycle, and then maintained at a temperature 212° F. (79° C.) during the remainder of the cooking cycle. For example, if the total cooking time is 30 minutes, it is important that the potato slabs/pieces receive a slow temperature rise in the first 10 minutes. It is also important that the potato slabs receive even cooking, and that the heating is continuous during at least the first one-third of the cooking cycle. Preferably, the heating is continuous throughout the cooking cycle and the potatoes are not allowed to cool until cooking is complete. This will allow the potato granules to sufficiently cook, swell, and gelatinize and will also allow some cells to shrink thereby increasing cell separation. Microscopic observations of potato cells from pieces/slabs that are prepared by heating the potato rapidly during the first one-third of the cooking cycle show that a case hardened surface forms on the outer portion of these potato cells and does not allow the potato cells to swell properly. As temperature and pressure is increased, the starch granules in the potato cells swell, gelatinize and burst [FIG. 4]. This results in flakes having a high water absorption index and low amylose content. If the potato pieces/slabs are undercooked, large amounts of raw starch can be seen in the microscopic observation. Additionally, overcooked potato pieces/slabs show weakened potato cell walls which burst during subsequent processing. (Amylose is trapped within the gelatinized amylopectin structure.) This results in flakes having a measurable low level of soluble starch and high water adsorption indexes. This is undesirable since high levels of gelatinized (amylopectin) starch will produce a sticky dough since water will be removed during subsequent cooking when the final farinaceous food product is made. By contrast, microscopic evaluations of potatoes pieces/slabs cooked by slowly raising the temperature during the first one-third of the cooking cycle according to the present invention show swollen granules, cell separation and less than 60% broken cells [FIG. 3].

The rate at which the potato pieces/slabs are heated during the first one-third of the cooking cycle and the distribution of the steam is important as it affects the properties of the resulting dehydrated flakes. Preferably, the temperature rise from about 175° F. (79° C.) to about 212° F. (100° C.) occurs over a time period more than about 10 minutes, more preferably in more than about 15 minutes and even more preferably in more than about 20 minutes. The total cooking time is at least about 30 minutes, preferably from about 30 to about 65 minutes, and more preferably from about 50 to about 60 minutes.

The potato pieces/slabs can also be cooked using a pressurized vessel or Superheated steam. The steam temperatures and pressures can vary depending on the equipment used. However, it is important that the resulting cooked potato pieces have swollen granules, cell separation and less than 60% broken cells.

After the steam cooking, the potato pieces/slabs are riced by forcing the potato pieces through a slotted plate. Care must be taken not to break the cell structure. Generally, at least about 0.1% emulsifier is added to the wet mash or cooked potatoes as a processing aid. Higher levels of up to about 3% of an emulsifier can also be added, if needed, to complex the amylose if the resulting mash is too sticky (e.g., too many broken cells due to overcooking). However, when the potato pieces/slabs are processed according to the present invention, high levels of emulsifier (e.g. greater than 1%) should not be required. Preferably, the emulsifier is added to the mash upon exiting the ricer and prior to the flaking operation. The preferred emulsifier is a distilled monoglyceride and diglyceride of partially-hydrogenated soybean oil. Other emulsifiers suitable as processing aids in making potato flakes known in the art, e.g. lactylate esters, can also be used.

Additional ingredients can also be added to the wet mash to improve the storage stability of the dehydrated potato flakes. Various stabilizers and preservatives are usually employed to improve the stability and texture of the resulting flakes. For example, from about 150 to about 200 parts per million (p.p.m.) of sulfite is provided in the dry product. This is added to the wet mash usually as dry sodium sulfite and sodium bisulfite and protects the flakes from darkening during processing and subsequent storage. Antioxidants such as BHA (2 and 3-tert-butyl-4-hydroxy-anisole) and BHT (3,5-di-tert-butyl-4-hydroxytoluene) are added in an amount up to a total of about 10 p.p.m. to prevent oxidative deterioration. Citric acid is generally added in a quantity sufficient to give about 90 p.p.m. in the dried product to prevent discoloration caused by the presence of ferrous ions. Ascorbic acid can also be added to warrant the initial level of vitamins.

The potato mash is then subjected to a drying and flaking operation. Water may be added to the mash to increase heat transfer during drying. Suitable dryers can be selected from those well known drying devices such as fluidized bed dryers, scraped wall heat exchangers, drum dryers, and the like. A particularly preferred dryer is a drum dryer. The use of drum dryers is known in the potato industry.

When a drum dryer is used, the mash is fed to the top surface of the drum by conveying means. Small diameter unheated rolls progressively apply fresh potato mash to portions already on the drum, thus building up a sheet. Peripheral speed of the small rolls is the same as that of the drum, and after traveling around the circumference of the drum a doctor knife removes the dried sheet by peeling the dried sheet away from the drum. Typically, the drum dryer itself is heated to temperatures within the range of from about 300° F. to about 380° F. preferably to a temperature of from about 330° F. to about 356° F. by pressurized steam contained within the drum at pressures of from about 100 psig to about 132 psig. For optimum results the rotational speed of the dryer drum and the internal temperature thereof is suitably controlled so as to give a final product having a moisture content of from about 5% to about 10%. Typically, a rotational speed of from about 2 rpm to about 6 rpm, preferably about 2 rpm to about 4.5 rpm, is sufficient.

The preferred process utilizes a twin double drum drier wherein the wet potato mash is spread on the drum in a thin sheet having a thickness of from 1 to about 5, preferably from about 4 to about 5, times the thickness of a single potato cell in an undried state, or about 0.007 to about 0.010 inches.

Once the wet mash is sheeted and dried, the resulting dried sheet is then comminuted with for example, an Urschel Comitrol, manufactured by Urschel Laboratories, Inc. of Valparaiso, Indiana. Any method of comminution that minimizes the starch damage, such as grinding, cutting or pulverizing can be used.

The resulting dehydrated potato flakes comprise from 19% to about 27% amylose, from about 5% to about 10% moisture, at least about 0.1% emulsifier and a water absorption index of from about 7.7 to about 9.5.

In another embodiment, potato flakes are made from pre-conditioned potato slabs, nubbins, and slivers or mixtures thereof. As used herein "pre-conditioned" refers to treatments such as blanching, water transporting which causes the cells to toughen. The dehydrated potato flakes can be made from slivers and nubbins (herein after refer to as "pieces"), as part or all of the potato ingredient, or the nubbins and slivers can be mixed together with potato slabs in the cooking process. Typically, the nubbins and slivers will be blanched since they are made in a standard French fry making process. The potato flakes can be made from about 5% to about 100% slivers, nubbins and mixtures thereof, and from about 0% to about 95% other potato pieces, typically slabs. Generally from about 5% to about 100% slivers, nubbins and mixtures thereof are used and from 0% to 95% potato slabs are used. Preferably, from about 20% to about 90% slivers, nubbins and mixtures thereof and from about 10% to about 80% potato slabs; more preferably from about 30% to about 80% slivers, nubbins and mixtures thereof and from about 20% to about 70% potato slabs; even more preferably from about 40% to about 70% slivers, nubbins and mixtures thereof and from about 30% to about 60% potato slabs; and especially preferably from about 50% to about 60% slivers, nubbins and mixtures thereof and from about 40% to about 50% potato slabs are used.

It has been found that blanching or pre-conditioning potato pieces/slabs cause the potato cells to toughen. As a result, when using pre-conditioned potato pieces, additional energy is required to cook the potato pieces properly (i.e., to obtain cooked potato pieces having swollen granules, cell separation and less than 60% broken cells). The pre-conditioning of the potato pieces/slabs causes the resulting potato flakes to have a lower water absorption index (WAI), and measurable amylose content than potato flakes produced from potato pieces/slabs that have not been pre-conditioned. However, the cooking process still requires controlling the rate at which the potato pieces are heated during the first one-third of the cooking cycle.

The increase in pressure and temperature needed to cook pre-conditioned potato pieces causes the resulting flakes to have a lower water absorption index and a lower amylose content than potato flakes produced from potato pieces that are not pre-conditioned prior to the cooking.

The dehydrated potato flakes resulting from the process wherein the potato pieces are pre-conditioned comprise from about 16% to about 20% amylose, from about 5% to about 10% moisture, at least 0.1% emulsifier, and a water absorption index of from about 6.7% to about 8.3%.

Therefore, within limits, the process of the present invention allows one to produce end products having controlled and different physical properties which cannot be duplicated by potato flakes made by prior art process conditions.

Physical Properties of the Potato Flake

The potato flakes of the present invention have unique physical properties, in particular; (1) amylose content, (2) water absorption index, and (3) hot paste viscosity and cold paste viscosity. The methods for measuring the physical properties of the potato flakes are described in the "Analytical Methods" disclosed below in the specification.

The potato flakes, when used in dough formulations, increase the cohesiveness, elasticity and sheeted strength of the dough. Additionally, use of the potato flakes of the present invention allows the food processor to control the amount of fat absorbed by the finished product during cooking, if fried. This is surprising considering the fact that when conventional potato flakes are used in dough formulation, additional ingredients (e.g., binders, gums, and fibers) are required to achieve similar results. It is also surprising that the addition of the potato flakes of the present invention to dough formulations improves processability of the dough.

It has unexpectedly been found that improved processability of the dough is achieved partially by controlling the cold paste viscosity and hot paste viscosity. This produces flakes that are stable (e.g., over various temperature ranges). In addition, it has also unexpectedly been found that the flakes of the present invention exhibit substantially improved color stability and resist viscosity changes over time. These properties have not been exhibited by potato flakes produced by known processes.

The dehydrated potato flakes of the present invention comprise from about 40% to about 60% broken cells, from about 16% to about 27% amylose, from about 5% to about 10% moisture, and at least 0.1% emulsifier. Additionally, the dehydrated flakes of the present invention have a water absorption index of from about 6.7 to about 9.5 grams of water per gram of flakes, a hot paste viscosity of from about 100 BU to about 320 BU and a cold paste viscosity of from about 100 BU to about 200 BU. From about 40% to about 60% of the dehydrated potato flakes remain on a #40 U.S. screen.

Broken Cells

The dehydrated potato flakes of the present invention comprise from about 40% to about 60% broken cells, preferably from about 45% to about 55% and more preferably about 50% broken cells. The percentage of broken cells is determined by light microscope and is an indication of the degree of cook and starch damage that has occurred during ricing and grinding. A large number of broken cells indicate improper processing conditions, such as, overcooking, use of too much shear and/or reducing the particle size of the potatoes by using an apparatus that applies too much shear, (e.g. a hammer mill) among other things.

Amylose—A (%)

The dehydrated potato flakes also comprise from about 16% to about 27% amylose (A %). The amylose is a measurement of the free starch in the potato flake composition. The level of amylose is controlled by maintaining a slow but constant temperature rise during the first ⅓ of the cooking cycle and by controlling the grinding step of the potato flaking process.

Dehydrated potato flakes made from raw potato pieces comprise from about 20% to about 27% amylose, preferably from about 22% to about 25%, and more preferably about 21% to about 24% amylose.

Dehydrated potato flakes made from pre-conditioned, or unpre-conditioned but pre-conditioned flakes by transporting them in cold water, potato pieces comprise from about 16% to about 20% amylose, preferably about from about 17% to about 19% amylose, and more preferably about 18% amylose.

Moisture

The dehydrated potato flakes of the present invention comprise from about 5% to about 10%, preferably about 6% to about 9%, and more preferably from about 7% to about 8% moisture.

Emulsifier

Typically an emulsifier is present in the flake because of its use as a processing aid to prevent the potato mash from sticking to the roller during drying and flaking. Therefore, low levels of emulsifiers are present in the flake. Typically the emulsifier is present in the flake at a level of from about 0.1% to about 1%. Preferably, the emulsifier is present in the flake at a level of from about 0.1% to about 0.5%, more preferably at about 0.2% to about 0.4%. Higher levels of emulsifiers can be present, for example, if the potatoes are overcooked and high levels of amylose are present in the potato mash. In these instances, the emulsifier may be present in a level as high as 3%. If the potato has been undercooked, the addition of emulsifiers will not correct the texture of the undercooked mash because of the large amount of raw starch.

Water Absorption Index (WAI)

Water absorption index is a physical parameter that indicates the capacity of a material such as potato flakes to hold water. It is directly proportioned to the degree of cooking. It theoretically correlates to the physical damage of the potato cells in the potato flakes. WAI also correlates in a small degree to surface area exposed as a result of grinding. In the process of making fabricated chips, the WAI is believed to correlate to the level of fat that will be absorbed in the final product during the frying process.

Dehydrated potato flakes made from raw potato pieces have a WAI of from about 7.7 to about 9.5 grams of water per gram of flakes, preferably from about 8 to about 9 grams of water per gram of flakes.

Dehydrated potato flakes that are made from pre-conditioned potato pieces have a WAI of from about 6.7 to about 8.3, preferably about 7 to about 8, grams of water per gram of flakes.

Hot Paste Viscosity (HPV) and Cold Paste Viscosity (CPV)

Figure 5:
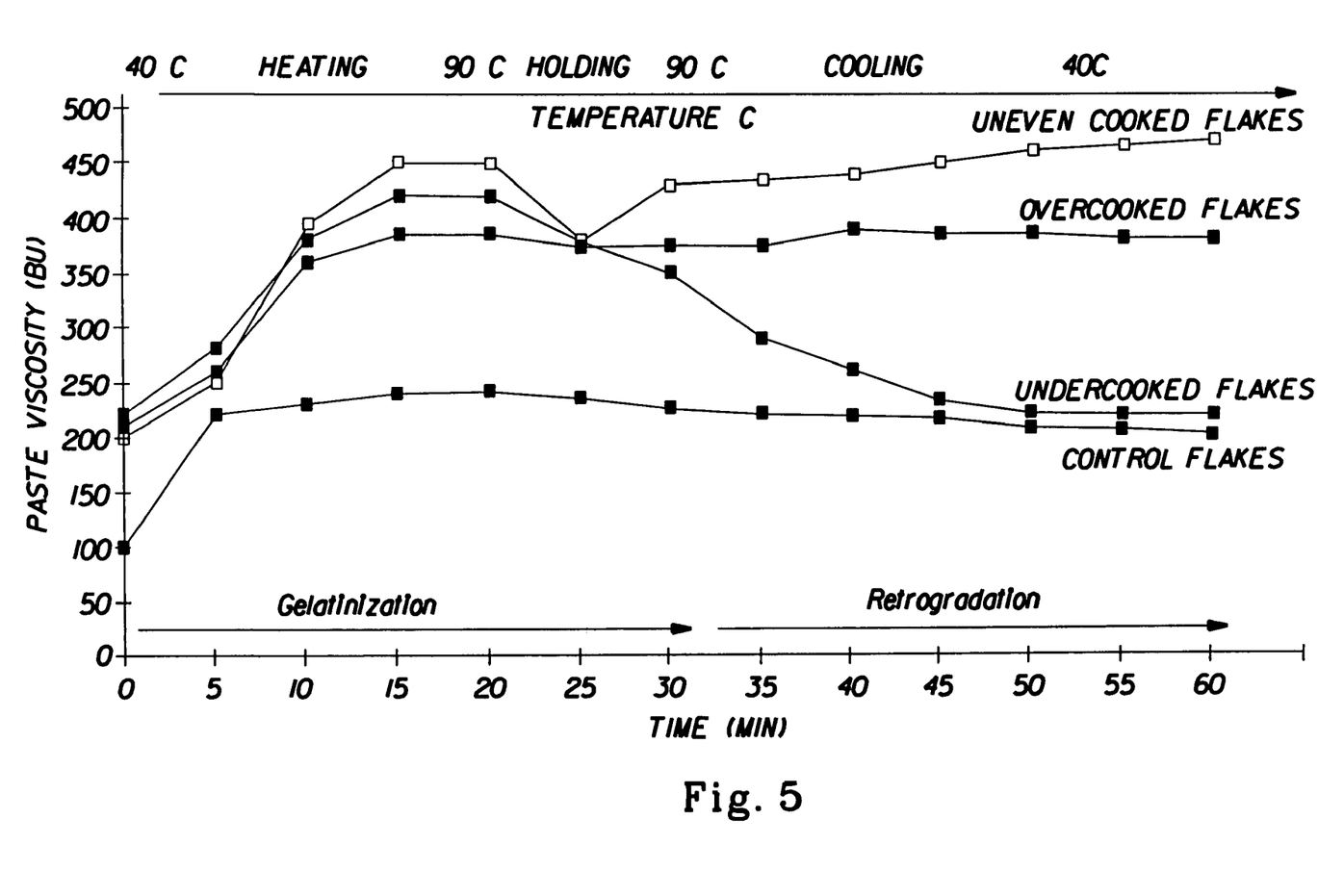
FIG. 5 is a graph showing the effects of various cooking conditions including overcooking, undercooking and even cooking on the hot and cold paste viscosities of potato flakes.

The hot paste viscosity (HPV) is a measurement of the highest viscosity peak of a starch material after applying high temperatures under constant shear rate. The initial part of the viscosity profile curve strongly correlates to WAI. For native starches, the hot paste viscosity profile will show a maximum peak viscosity in the range of the gelatinization temperature. In the case of potato flakes, as well as other partially gelatinized starches, the HPV is used as an indication of the degree of cooking and cell damage. The higher HPV profiles indicate more cell damage due to overcooking in the flaking process [FIG. 5]. Large differences between HPV and cold paste viscosity indicate uneven cooking [FIG. 5] in the flakes of the present invention The difference between the HPV and CPV is preferably 150 BU, more preferably less than about 120 Brabender Units (BU), and even more preferably less than about 100 BU. These differences indicate even cooking [FIG. 5 "control"].

Cold paste viscosity (CPV) is a measurement of the highest peak viscosity of a starch material at low temperatures under a constant shear rate. The cooling part of the viscosity profile curve strongly correlates to the free amylose level in the sample. For overcooked starches, the CPV increases [FIG. 5]. The cooling curve is an indication of the starch retrogradation happening during the process. The HPV CPV are measured in Brabender Units (BU) which is an arbitrary unit of viscosity measurement, roughly correlating to centipoise.

Dehydrated potato flakes made from raw potato pieces have a CPV of from about 240 by to about 320 BU, preferably from about 260 by to about 300 BU, and more preferably from about 275 by to about 290 BU; and a CPV of from about 120 by to about 230 BU, preferably from about 150 by to about 220 BU and more preferably from about 170 by to about 210 BU.

Dehydrated potato flakes made from pre-conditioned potato pieces have a HPV of from about 100 to about 280 BU, preferably 150 by to about 250 BU and more preferably from 190 by to about 230 BU; and a CPV of from about 100 by to about 200, preferably from about 120 by to about 210 by and more preferably 140 by to about 160. Analysis of the HPV and CPV prepared by prior art processes dehydrated potato flakes have a HPV and CPV that increase over time. In contrast to flakes of the present invention, flakes prepared by prior art processes have HPV and CPV differences of greater than 120 bU's as compared to flakes of the present invention.

Particle Size Distribution

The particle size of the dehydrated potato flakes of the present invention is reduced such that from 60% to about 70% remain as a #100 U.S. screen, from a 20% to about 40% remain on a #40 U.S. screen, from about 1 to about 3% remain on a #20 U.S. screen and from 1% to about 3% remain on a #16 U.S. screen. Particle size distribution is a measure of the granularity of the flakes. It is generally a weight-based distribution of flakes based on the size of particles. Normally, it is described by a set of U.S. standard measure sizes. Reducing the size of the dehydrated flakes such that there are more fines can change the physical properties of the flake. For example, reducing the particle size results in an increased amylose content and an increase in the number of broken cells, as well as a change in WAI.

Dough

Another embodiment of the present invention includes using the dehydrated flake in a composition for dough. The dough can be used to make fabricated farinaceous food products. The addition of the dehydrated flakes to the dough increases the sheet strength of the dough and gives food processors flexibility to control the properties of the dough and final products made from the dough.

Typically, the dough is used to make fabricated potato chips. However, the dough can also be used to make other farinaceous products which are sheeted or extruded (e.g., chips, tortilla chips, pretzels, crackers and the like, hereinafter referred to as "snacks"). The dough composition of the present invention comprise:

(a) from about 50% to about 70% of a starch-based material wherein said starch-based material comprises up to 100% potato flakes of this invention;
(b) at least about 3% hydrolyzed starches having a D.E. of from about 5 to about 30; and
(c) from about 20% to about 46.5% added water.

Optionally, from about 0.5% to about 6% of emulsifier may be added to the dough compositions as a processing aid.

The doughs of the present invention additionally have a sheet strength between about 140 and 625 grams force (gf).

The doughs of the present invention can comprise from about 50% to about 70%, preferably from about 55% to about 65%, and more preferably about 60% of a starch-based material. The starch-based material can comprise from about 25 to 100% potato flakes of the present invention, with the balance (i.e., from 0% to about 75%) being other starch-containing ingredients such as potato flour, potato granules, corn flour, masa corn flour, corn grits, corn meal, rice flour, tapioca, buckwheat flour, rice flour, oat flour, bean flour, barley flour, tapioca, as well as modified starches, native starches, and dehydrated starches, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, cornstarch, oat starch, cassava starch, rice starch, wheat starch, and mixtures thereof. The starch-based material preferably comprises from about 40% to about 90%, more preferably from about 50% to about 80%, and even more preferably about 60% to about 70%, potato flakes of the present invention, and from about 10% to about 60%, preferably from about 20% to about 50%, and more preferably from about 30% to about 40%, of these other starch-containing ingredients.

Particularly preferred starch-based materials of the present invention are made from dehydrated potato flakes of the present invention and potato granules wherein the potato flakes comprise from about 25% to about 95%, preferably from about 35% to about 90%, and more preferably from about 45% to about 80% of the starch-based material, and the potato granules comprise from about 5% to about 75%, preferably from about 10% to about 65%, and more preferably from about 20% to about 55%, of the starch-based material.

Another preferred embodiment can be made using a mixture of the potato flakes of the present invention and potato granules, combined with other starch-containing ingredients that are not potato flakes or granules. Typically, the combined flakes and granules comprise from about 40% to about 90%, preferably from about 50% to about 80%, and more preferably from about 60% to about 70% of the starch-based material, while the other non potato flake/granule starch-containing ingredients comprise from about 10% to about 70%, preferably from about 20% to about 50%, and more preferably from about 30% to about 40%, of the starch-based materials.

The dough compositions of the present invention comprise from about 20% to about 46.5% added water, preferably from about 22% to about 40%, and more preferably from about 24% to about 35%, added water. As used herein, the term "added water" refers to water which has been added to the dry dough ingredients. Water which is inherently present in the dry dough ingredients, such as in the case of the sources of flour and starches, is not included in the added water. The level of water in flours and starches is usually from about 3% to about 8%. However, if the maltodextrin or corn syrup solids are added as a solution or syrup, the water in this syrup or solution must be accounted for as "added water". The amount of added water includes any water used to dissolve or disperse ingredients, as well as water present in corn syrups, etc.

In addition to the starch-based material and water, the dough compositions comprise other ingredients that aid in processability. These ingredients are particularly important when processing a dough that is to be sheeted on a continuous basis. The additional ingredients include, but are not limited to, hydrolyzed starches and emulsifiers.

Hydrolyzed starches are important to the processability of the doughs of the present invention which have relatively low water levels. In the absence of hydrolyzed starches, low moisture levels in the dough; can prevent formation of a continuous, smooth extensible dough sheet; can hinder subsequent expansion of the dough pieces during frying; and affects the elasticity of the dough. Although the dough compositions can be sheeted without the inclusion of hydrolyzed starches, the resulting snack has a foamy texture and high fat. Hydrolyzed starches reduce the work input to the dough, reducing the amount of water needed to sheet the dough. This in turn reduces fat.

Hydrolyzed starches can be included in the dough compositions in an amount of at least about 3%, with a usual range of from about 3% to about 15%. Preferably, hydrolyzed starches are included in an amount of from about 5% to about 12%. Suitable hydrolyzed starches for inclusion in the dough include maltodextrins and corn syrup solids. The hydrolyzed starches for inclusion in the dough have Dextrose Equivalent (D.E.) values of from about 5 to about 30, preferably from about 10 to about 20. Maltrin™ M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the more reducing sugars are present.

Emulsifiers

Another ingredient that can be added optionally to the dough compositions to aid in the processability of the dough is an emulsifier. The emulsifier works via several mechanisms. The first is as a coating of the flour in the mixer just prior to the addition of the water. This limits the moisture absorption of the flour producing a "short" dough. The second function of the emulsifier is to create a dispersion of fat and moisture droplets throughout the dough. Both of these mechanism tend to limit the adhesiveness of the starch contained in the flour, preventing permanent adhesion to the sheeting rolls.

An emulsifier is preferably added to the dough composition prior to sheeting the dough. The emulsifier can be dissolved in a fat or in a polyol fatty acid polyester, preferably a sucrose fatty acid polyester such as Olean™, available from The Procter and Gamble Company. Suitable emulsifiers include mono- and diglycerides, diacetyl tartaric acid esters and propylene glycol mono- and diesters and polyglycerol. Polyglycerol emulsifiers such as monoesters of polyglycerols, preferably hexapolyglycerols can be used.

Particularly preferred emulsifiers comprise a blend of from about 42.5% to about 90%, preferably from about 50% to about 85%, more preferably from about 60% to about 80%, non-digestible fat with the balance being a mixture of diglyceride, triglyceride, and preferably a monoglyceride wherein the level of monoglyceride is at least about 30%, and is typically from about 30% to about 95%, preferably from about 50% to about 90% wherein the monglyceride has an IV of greater than about 60, preferably an IV between about 70 to about 120, more preferably an IV of from about 80 to about 110, even more preferably an IV of from about 90 to about 100.

Preferably, the mono-glyceride is a distilled monoglyceride having an IV of about 60, derived from, for example, soybean oil, rapeseed oil, cottonseed oil, sunflower seed oil, palm oil, palm olein, safflower oil, corn oil, peanut oil and mixtures thereof. The preferred distilled monoglycerides include but are not limited to monoglycerides derived from soybean oil, rapeseed and palm oil and mixtures thereof.

Typically commercially available mono-glycerides contain varying amounts of di- and tri-glycerides. For example, distilled monodiglyceride comprise about 90% monoglyceride while monodiglycerides comprise about 30% mono-glycerides. Either can be used in the dough fomulations of the present invention.

A particularly preferred monoglyceride is sold under the trade names of Dimodan® available from Danisco, New Century, Kansas and DMG 70, available from Archer Daniels Midland Company, Decatur, Ill.

The level of added emulsifier depends on the amount of work input that the dough will receive in subsequent processing (e.g., extrusion, sheeting) steps. As used herein, the term "added emulsifier" refers to an emulsifier which has been added to the dry dough ingredients. Emulsifiers which are inherently present in the dry dough ingredients, such as in the case of the potato flakes, are not included in the term "added emulsifier."

The need for higher levels of emulsifier increases as work input increases. Typically, if the doughs are to be sheeted, emulsifiers are added to the dough in an amount of from about 0.5% to about 6.0% by weight, preferably from about 1.0% to about 5.0%, more preferably from about 2 to about 4% and most preferably about 3%. Emulsifiers levels higher than this result in sheet tears and pinholes.

Additional Ingredients

Additional ingredients can also be added to the dough compositions. These ingredients include vitamins, salt, flavorings, flavor potentiators, and/or seasonings. Particularly preferred is the use of Vitamin C. Vitamin C can be present in the dough compositions at a level of from about 0.01% to about 0.10%, preferably at a level of from about 0.02% to about 0.08%, more preferably at a level of from about 0.03% to about 0.07%, and even more preferably at a level of from about 0.04% to about 0.06%. Preferably the dough is fortified such that the final snack comprise from about 2 mg. to about 8 mg., preferably from about 4 mg. to about 6 mg. of Vitamin C per one ounce serving of snack. The additional ingredients can be included in the dough or sprinkled or sprayed on the surface of the snack after frying.

Sheet Strength

The dough compositions containing the potato flakes of the present invention exhibit substantially improved sheet strength as compared to doughs of the same composition made with prior conventional potato flakes. The sheet strength is a measurement of the force needed to break a piece of dough. The sheet strength correlates with cohesiveness of the dough and the ability of the dough to resist developing holes and/or tearing during subsequent processing steps.

Figure 1:
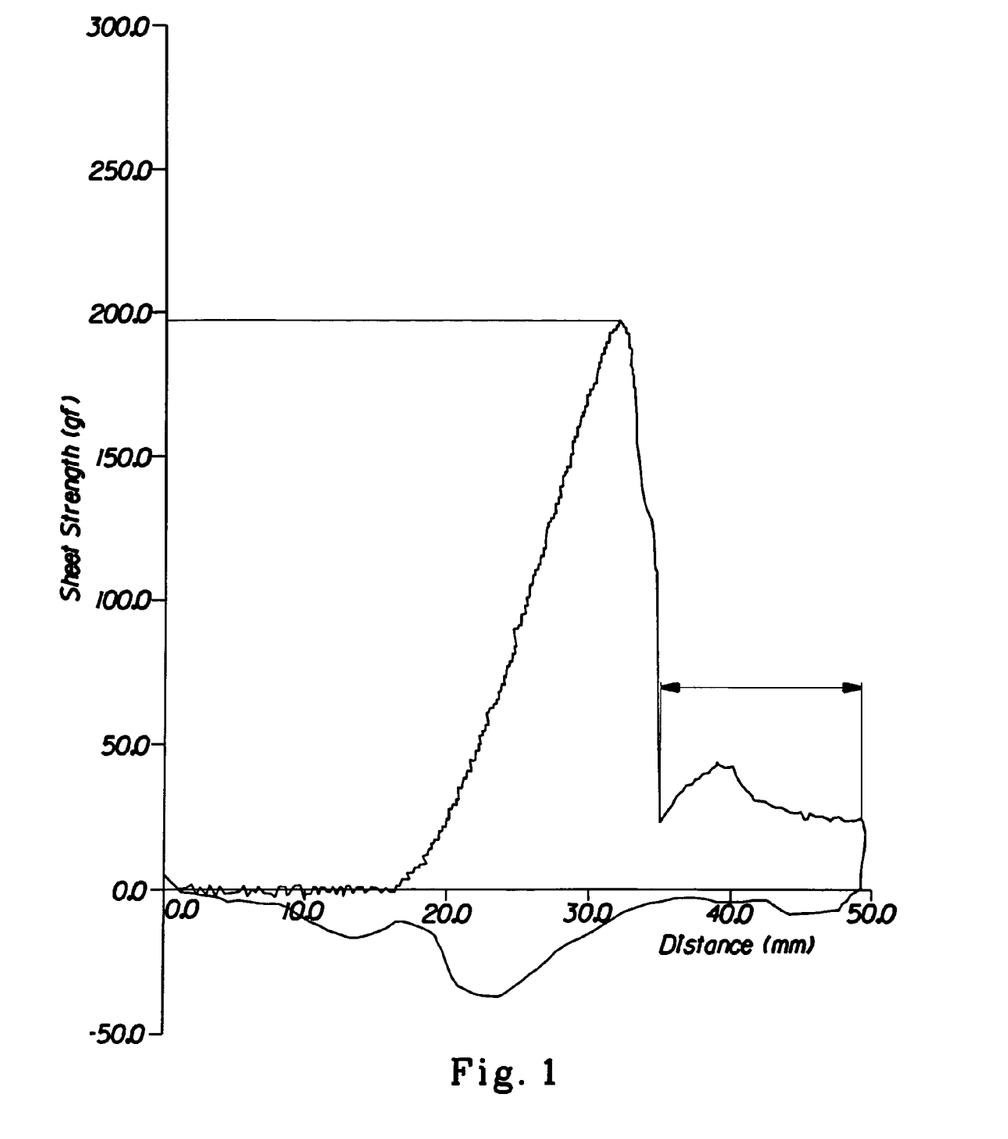
FIG. 1 is a graph showing the sheet strength test of a dough made from the potato flakes of the present invention.

The sheet strength of the doughs of the present invention increases as the amount of energy input during the dough making step increases. Factors which can affect energy input include, but are not limited to, mixing conditions, dough sheet formation, and the amount of measurable amylose. For example, doughs mixed in a conventional low work input mixer, for example a Hobart® or Cuisinart® will typically have a sheet strength between about 140 to about 250 depending on whether the starting potato has been pre-conditioned or not [FIG. 1].

Dough compositions receiving relatively low work input comprising potato flakes made from raw potato pieces typically have a sheet strength measurement of from about 170 gf to about 250 gf, preferably from about 180 gf to about 240 gf, and more preferably from about 190 gf to about 220 gf.

Dough compositions receiving relatively low work input comprising potato flakes made from pre-conditioned potato pieces typically have a sheet strength measurement of from about 140 gf to about 200 gf, preferably from about 155 gf to about 190 gf, and more preferably from about 165 gf to about 185 gf.

Doughs produced on a commercial scale where higher work input mixers, for example a Turboilizer® or extruder are used, the sheet strength is generally about 1.5 times to about 2.5 times the sheet strength of the doughs produced from the low work input mixer.

Figure 2:
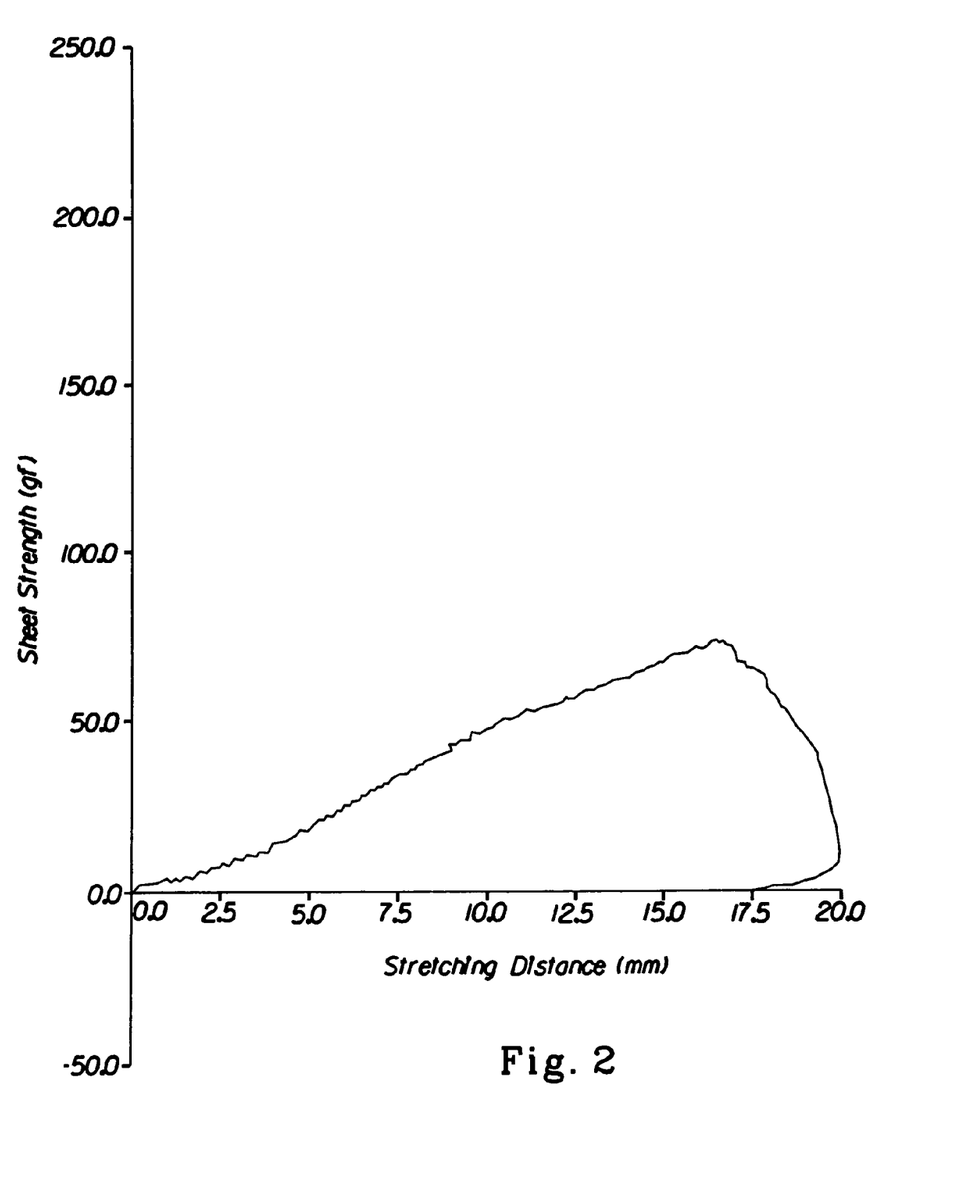
FIG. 2 is a graph showing the sheet strength test of a dough made from conventional the potato flakes.

As shown in FIG. 2, doughs made under same work input using conventionally made flakes have a sheet strength lower than the doughs of the present invention.

Preferably, doughs produced from a high work input mixer have a sheet strength between about 210 and about 625 gf, preferably from about 225 gf and about 560 gf, more preferably from about 245 gf and about 500 gf, even more preferably from about 265 gf to about 480 gf, and especially preferably from about 200 gf to about 400 gf.

A. Dough Preparation

The dough compositions of the present invention can be prepared by any suitable method for forming sheetable doughs. Typically, a loose, dry dough is prepared by thoroughly mixing together the flakes, granules and other starch-based materials and optionally an emulsifier and sucrose fatty acid polyester combination. A water pre-blend of flavoring (optional), hydrolyzed starches, sucrose and/or salt are separately mixed to obtain the previously defined hydrolyzed starch and water levels. The water pre-blend is then added to the starch-based material mixture and emulsifier blend. Preferred devices for mixing together the dough ingredients are conventional mixers. Hobart® mixers are used for batch operations and Turbolizer® mixers can be used for continuous mixing operations. However, extruders can also be used to mix the dough and to form the sheets or shaped pieces.

B. Sheeting, Snack Piece Formation and Frying

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should be heated to about 90° F. (32° C.) to about 135° F. (57° C.). In a preferred embodiment, the mill rolls are kept at two different temperatures, with the front roller being cooler than the back roller.

Dough compositions of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 inches to about 0.080 inches (1.65 to 2.03 mm). For rippled (wavy shaped) chips, the preferred thickness is about 0.75 inches (1.9 mm). The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in published PCT application WO 95/07610, Dawes et al., Jan. 25, 1996, which is incorporated by reference.

After the snack pieces are formed, they are cooked until crisp. The snack pieces may be cooked by baking, frying, and combinations thereof. For example the chips can be fried only, baked only, partially fried then baked or partially baked then fried.

The snack pieces may be baked at a temperature between about 300° F. (149° C.) to about 450° F. (232° C.) for a time sufficient to form a skin the surface of the chips, and then fried to doneness. If desired, the snack pieces can also be fried to moisture content of 10% or less and then heated with hot air, superheated steam or inert gas to lower the moisture level to 4% or less. This is a combined frying/baking step.

It is preferred to fry the snack pieces in oil at temperatures from about 275° F. (135° C.) and about 400° F. (204° C.), preferably from about 300° F. (149° C.) to about 375° F. (191° C.), and more preferably from about 315° F. (157° C.) to about 350° F. (177° C.) for a time sufficient to form a product having from about 0.5% to about 6%, preferably from about 1% to about 5%, and more preferably from about 2% to about 4% moisture. The exact fry time is controlled by the temperature of the frying fat and the starting water content. The fry time and temperature can be easily determined by one skilled in the art.

Preferably the snack pieces are fried in frying fat using a continuous frying method and are constrained during frying. This constrained frying method and apparatus is described in U.S. Pat. No. 3,626,466 (Liepa, 1971). The shaped, constrained pieces are passed through the frying medium until they are fried to a crisp state with a final moisture content of about 0.5% to about 4% water, preferably 1% to 2%.

Continuous frying or batch frying of the snack pieces in a non-constrained mode is also acceptable. In this method, the pieces are immersed in the frying fat on a moving belt or basket.

The frying can be done in convention triglyceride oils, or, if desired, the frying can be done in low calorie fat-like materials such as those described in U.S. Pat. No. 3,600,186 to Mattson et al. (assigned to The Procter & Gamble Co), issued May 12, 1970; U.S. Pat. No. 4,005,195 to Jandacek (assigned to The Procter & Gamble Co.), issued Jan. 25, 1977; U.S. Pat. No. 4,005,196 to Jandacek et al. (assigned to The Procter & Gamble Co.), issued Jan. 25, 1977; U.S. Pat. No. 4,034,083 to Mattson (assigned to The Procter & Gamble Co.), issued Jul. 5, 1977; and U.S. Pat. No. 4,241,054 to Volpenhein et al. (assigned to The Procter & Gamble Co.), issued Dec. 23, 1980, all of which are incorporated by reference herein. Frying can also be done in mixtures of conventional triglyceride oils and non-digestible oils.

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fat, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

The terms "fat" or "oil" also refer 100% non-toxic fatty materials having properties similar to triglycerides. The terms "fat" or "oil" in general include fat-substitutes, which materials may be partially or fully non-digestible.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentearythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

The preferred non-digestible fats are fatty materials having properties similar to triglycerides such as sucrose polyesters. OLEAN,™ a preferred non-digestible fat, is made by The Procter and Gamble Company. These preferred non-digestible fats or oil substitute compositions are described in Young; et al., U.S. Pat. No. 5,085,884, issued Feb. 4, 1992, and U.S. Pat. No. 5,422,131 issued Jun. 6, 1995 to Elsen et al.

Other ingredients known in the art may also be added to the edible fats and oils, including antioxidants such as TBHQ ascorbic acid, chelating agents such as citric acid, and antifoaming agents such as dimethylpolysiloxane.

The snack products made from this process typically have from about 19% to about 38%, preferably from about 20% to about 35%, and more preferably from about 23% to about 32% fat. If a higher fat level is desired in the snack product to further improve the lubricity of the snack, oil can be sprayed onto the snack product when it emerges from the fryer, or when it is removed from the mold used in constrained frying. Preferably the oils for spraying will have an iodine value greater than 75, and most preferably above 90. Oils with characteristic flavors or highly unsaturated oils can be sprayed onto the snack product. Oils with added flavors can also be used. These include butter flavored oils, natural or artificial flavored oils, herb oils and oils with garlic or onion flavors added. This is a way to introduce a variety of flavors without having the flavor undergo browning reactions during the frying. It also avoids adding the flavor to the dough and having the flavor react with or leach into the oil during the frying process. This method can be used to introduce healthier oils which would ordinarily undergo polymerization or oxidation during the heating necessary to fry the snacks.

Oil spray can be applied to the snack product after baking or frying. The oil may be used to increase the fat content of the snack to a fat content as high as 44% oil. Thus a snack product having various fat contents can be made using this additional step.

Analytical Methods

Water Absorption Index (WAI)

In general, the terms "Water Absorption Index" and "WAI" refer to the measurement of the water-holding capacity of any carbohydrate based material as a result of a cooking process. (See for example Anderson, R. A., Conway, H. F., Pfeifer, V. F. and Griffin, Jr., E. L., 1969, *Gelatinization of Corn Grits By Roll-and Extrusion-Cooking.* CEREAL SCIENCE TODAY; 14(1):4). The cooking and dehydration of potato flakes introduces changes in the potato cell physiology which affects its rehydration properties, specifically its water-holding capacity. This measurement is typically expressed as the ratio of mass of water held per unit mass of material.

The WAI for a sample is determined by the following procedure: The weight to two decimal places of an empty centrifuge tube is determined. Two grams of dry sample (e.g., potato flakes) are placed into the tube. Thirty milliliters of water is added to the tube. The water and sample are stirred vigorously to insure no dry lumps remain. The tube is placed in a 30° C. (85° F.) water bath for 30 minutes, repeating the stirring procedure at 10 and 20 minutes. The tube is then centrifuged for 15 minutes at 3,000 RPM. The water is then decanted from the tube, leaving a gel behind. The tube and contents are weighed. The WAI is calculated by dividing the weight of the resulting gel by the weight of the dry sample (i.e., [weight of tube and gel]−[weight of tube]÷[weight of dry flakes]).

Percent Amylose (A %) Test

This method is designed to measure the percentage (relative quantity) of amylose in potato flakes which is soluble in 0.1N NaOH solution under specific test conditions. Flakes are stirred in a base solution at 60° C. for 30 minutes, centrifuged, and the clear supernatant is then reacted with iodine and analyzed spectrophotometrically. The amylose is measured as the iodine complexes at 700 nm, rather than 610 nm, to avoid the interference from the "amylopectin-$I_2$complex".

Apparatus

Volumetric flakes, volumetric pipettes, balance, spectrophotometer (Beckman Model 24 or equivalent), cells (1 cm disposable, Marksman Science #1-P-10, or 1 cam sipper type Markson MB-178 or Beckman Part #579215), constant temperature bath, blender and blender jars.

Reagents

Sodium Hydroxide Solution 0.1N, Hydrochloric Acid, Iodine, Potassium Iodide, Calibration Standard (Amylose—Sigma Type III potato cat. # A-0512).

Preparation of Solutions

A. Stock Iodine Solution

Weigh 2 g of Iodine and 20 g of Potassium Iodide into a red 250 ml volumetric flask, and dissolve with distilled water.

B. Reagent Iodine Solution

Pipet 10 ml of the stock Iodine solution and 2 ml of concentrated hydrochloric acid into a red 1000 ml volumetric flask. Dilute to volume with distilled water.

Standard Curve Preparation Using Standard Amylose

1. Dissolve 1 g of amylose (Sigma, from potato) with 100 0.1N NaOH. Transfer entire solution into a centrifuge bottle, without rinsing. Centrifuge at 1600 rpm for 15 min.

2. Prepare three dilutions: a) 10 ml of supernatant into 100 ml of 0.1N NaOH, b) 5 ml of supernatant of first dilution into 100 ml of 0.1N NaOH, and c) 50 ml of the second dilution into 100 ml of 0.1N NaOH.

Sample Preparation

1. Obtain percent moisture in each sample. (Vacuum oven 16 hours 70° C., or 3 hr@ 130° C. in an air oven).
2. Weigh 0.2 g of potato flakes and dissolve with 100 ml of 0.1 N NaOH solution. Turn the stirrer on high to obtain a good vortex in the liquid.
3. Place samples in the 60° C. water bath. Stir for 30 minutes. Remove from bath.
4. Pour the entire solution into a centrifuge bottle; do not rinse. Centrifuge at 1600 rpm for 15 minutes.
5. Pipet 1 ml of the supernatant into a 25 ml volumetric flask. Dilute all the volume with iodine reagent. Prepare the blank solution, using 1 ml of the 0.1N NaOH solution in a 25 ml flask. Shake well. The colorimetric determination must be made 10-30 minutes after mixing.

Colorimetric Determination

Set the wavelength to 700 nm. Zero the instrument with distilled water in the sample cell and in the reference beam. Fill the sample cell with blank solution and read against distilled water. Note this value and subtract from each sample value. In normal practice, the absorbances falls between 0.02 and 0.8 absorbance units.

Calculations (Using the Standard Amylose):

Plot a curve using g/100 ml of standard concentrations as the x axis versus the absorbance @ 700 nm as the y axis.

$$\% \text{ Amylose} = \frac{(\text{Amylose g}/100 \text{ ml})}{\frac{(100 - \% \text{ water}) \times (\text{Sample wt.})}{100}} \times 100$$

Percent of Broken Cells Test

The percent of broken cells in the potato flakes and the average size of the cells is determined by simple observation through the light microscope. A small amount of flakes is spread on a portaglass, and 2-3 drops of water are added immediately. After 30 sec., the sample is ready to be observed through the light microscope (×100). The % broken cells are determined.

Hot Paste and Cold Paste Viscosities

Accurately weigh 30 g of flakes on a moisture free basis and transfer quantitatively to a 600 ml beaker. Add about 400 ml of water to the flakes sample and mix thoroughly to obtain a homogeneous suspension. The dispersion is transferred to the sample cup of an amylograph and the instrument head is lowered into the operating position. Start the amylograph with the thermo-regulator transport switch in the neutral position, heat off, and the cup speed at 75 rpm. Heat at a rate of 1.5° C. per min. until the sample reaches 90° C. The thermo-regulator switch is set at neutral and held at 90° C. for 10 min. This is the hot paste viscosity. Then the thermo-regulator switch is changed to cool at 1.5° C. per minute to 50° C. This is the cold paste viscosity. (The Amylograph Handbook, edited by William C. Shuey and Keith H. Tipples, AACC, 1994.) Hot and cold paste viscosities are measured in Brabender Units (BU).

Particle Size Distribution Test

1. Weigh dehydrated potatoes.
2. Weigh the screens and then stack them in the following order top to bottom: U.S. #16, #20, #40, #100 and bottom pan. Pour in the dehydrated potatoes. Put the screens in a rotap unit. Turn on the rotap unit for one minute.
3. Weigh and record the total weight of potato material on the screens.

Sheet Strength Test

The sheet strength is determined as follows: Sheet strength is the measurement of the force needed to break a dough sheet of 0.635 mm. The sheet strength is read as the maximum peak force (gf) of a graph obtained from force against distance. The test is designed to measure potato dough sheet strength. All products are tested at room temperature. Sheet strength is an average of ten repetitions of each test. The sheet strength is measured by preparing a dough comprising:
 a) 200 g of solids;
 b) 90 g of water; and
 c) 0.5 g of distilled mono and diglyceride of partially hydrogenated soybean oil emulsifier available from Quest.

The dough is made in a small Cuisinart® mixer at low speed for 10-20 seconds. After mixing the dough is sheeted using a conventional milling machine to a thickness of 0.635 mm (22 mils). The mill rolls are usually 1.2 meter length× 0.75 diameter meter.

This test is conducted using a Texture Analyzer (TA-XT2) from Texture Technologies Corp. This equipment uses a software called XTRAD. This test utilizes a 7/16" diameter acrylic cylinder probe (TA-108), which has a smooth edge to minimize any cutting of the dough sheet. The dough sheet is held between two aluminum plates (10×10 cm). The aluminum plates have a 7 cm diameter opening in the center. Through this opening the probe makes contact with the sheet and pushes it downwards until it breaks. These plates have an opening in each corner to hold the sheet dough in place. Each dough sheet is pre-punched with holes to fit over the alignment pins at the corners of the plate and cut to the size (10×10 cm) of the plate. This provides uniform tension as the probe moves down and through the sheet. The probe travels at 2 mm/second until the dough sheet surface is detected at 20 grams of force. The probe then travels at 1.0 mm/second for up to 50 mm, a distance chosen to stretch the dough sheet until it thoroughly ruptures. The probe withdraws at 10.0 mm/second. The probe is run in a "Force vs Compression" mode, which means the probe will move downward measuring the force.

The embodiments of the present invention are illustrated by the following examples.

EXAMPLES 1-3

Examples 1-3 are prepared from (1) pre-conditioned potato slabs, (2) a combination of slabs, slivers and nubbins and (3) slivers and nubbins. The potato pieces are processed according to the method of the present invention. The potato mash is drum dried. The physical properties of the dehydrated flakes are measured and microscopic observations are made. The processing parameters and physical properties of the dehydrated potato flakes are listed in Table 1 and Table 2 below.

TABLE 1

Process parameters for making dehydrated potato flakes

| Process Parameters | Example 1 | Example 2 | Example 3 |
|---|---|---|---|
| % Pre-conditioned Slabs | 100 | 60 | 0 |
| % Slivers & nubbins | 0 | 40 | 100 |
| Cooking Pressure (PSI) | 5 | 5 | 5 |
| Cooking time (min) | 19 | 21 | 23 |
| Drum Speed (rev/sec) | 10.5 | 10.5 | 10.5 |
| Sheet Thickness (mm) | 0.2 | 0.2 | 0.2 |

TABLE 2

Physical properties of dehydrated potato flakes

| Flake Properties | Example 1 | Example 2 | Example 3 |
|---|---|---|---|
| Moisture (%) | 6.0 | 6.0 | 6.0 |
| WAI | 7.9 | 8.6 | 8.1 |
| Amylose (%) | 20 | 22.0 | 22.5 |
| HPV (BU)* | 290 | — | 320 |
| CPV (BU) | 200 | — | 220 |
| Microscopic Observation | 50% broken cells | 50% broken cells | 50% broken cells |

*Brabender Units

EXAMPLES 4-5

The following examples compare dehydrated potato flakes prepared according to a conventional process conditions to dehydrated potato flakes prepared according to the present invention. See Table 3. The raw potato used to produce the flakes of Example 4 is fast cooked (i.e., temperature rise of about 75° F./minute until the potato slabs reach a temperature of about 180° F.). The raw potatoes used to produce the potato flakes of Example 5 is slow cooked (i.e., temperature rise of about 12° F./minute until the potato slabs reach a temperature of about 180° F.).

TABLE 3

Comparison of dehydrated potato flakes

| Process Parameters | Example 4 | Example 5 |
|---|---|---|
| % Slabs | 100 | 100 |
| Cooking Pressure (psi) | 45 | 10 |
| Cooking time (min) | 50 | 28 |
| Drum Speed (rev/sec) | | 4.5 |
| WAI | 10.3 | 8.5 |

TABLE 3-continued

Comparison of dehydrated potato flakes

| Process Parameters | Example 4 | Example 5 |
|---|---|---|
| Amylose (%) | 8.4 | 22.3 |
| HPV (BU)* | 400 | 280 |
| CPV (BU) | 200 | 200 |

EXAMPLE 6

A dough composition is prepared from the potato flakes of the present invention having the physical properties listed below. The dough composition comprises 30% water and 70% of the following mixture of ingredients:

| Ingredient | Wt. % in mixture |
|---|---|
| Potato flakes | 78 |
| Wheat Starch | 9 |
| Corn Meal | 9 |
| Malto-dextrin | 4 |

The physical properties of dehydrated potato flakes used are shown in the following table:

| Flake Properties | Example |
|---|---|
| Moisture (%) | 6.0 |
| WAI | 8.5 |
| Amylose (%) | 24 |
| HPV (BU)* | 200 |
| CPV (BU) | 200 |
| Microscopic Observation | 50% broken cells |

*Brabender Units

The potato flakes, wheat starch and corn meal are blended in a Turbulizer® mixer. The maltodextrin is dissolved in the water and added to the blend. The blend is mixed to form a loose, dry dough.

The dough is sheeted by continuously feeding it through a pair of sheeting rolls forming an elastic continuous sheet without pin holes. Sheet thickness is controlled to 0.02 inches (0.05 cm). The dough sheet strength is 211 gram force.

The dough sheet is then cut into oval shaped pieces and fried in a constrained frying mold at 375° F. for about 12 seconds. The frying oil is a blend of cottonseed and corn oils. The fried pieces contain about 38% fat.

EXAMPLE 7

A dough is prepared from the following ingredients:

| Ingredient | Wt. % of total formula |
|---|---|
| Potato flakes (same as in example 1) | 53.10 |
| Potato granules | 5.90 |
| Maltodextrin | 4.50 |
| Water | 32.70 |
| *Emulsifier | 3.00 |
| Sugar | 0.40 |
| Salt | 0.40 |

The maltodextrin is mixed with water to make a syrup. The syrup is added to the remaining ingredients as in Example VI to make a loose, dry dough.

The dough is sheeted by continuously feeding it through a pair of sheeting rolls forming an elastic continuous sheet without pin holes. Sheet thickness is controlled to 0.02 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) in OLEAN™ (a non-digestible fat made by The Procter and Gamble Company) for about 12 seconds. The product is held in the molds for about 20 seconds to allow the OLEAN™ to drain. The resulting product has a non-digestible fat level of about 30%. The digestible fat level from the emulsifier is less than 0.25 grams/30 gram serving.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the aft that various other changes and modifications can be made without departing from the spirit and scope of the invention. It is therefore intended to cover in the appended claims all such changes and modifications that are within the scope of this invention.

What is claimed is:

1. A fabricated potato chip made from a dough, wherein said dough comprises potato flakes, and wherein said potato flakes comprise:
    (a) from about 40% to about 60% broken cells;
    (b) from about 16% to about 27% amylose; and
    (c) from about 5% to about 10% moisture; and
    wherein said potato flakes have a particle size distribution such that:
        (1) from 60% to about 70% remain on a #100 U.S. screen;
        (2) from 20% to about 40% remain on a #40 U.S. screen;
        (3) from about 1% to about 3% remain on a #20 U.S. screen; and
        (4) from 1% to about 3% remain on a #16 U.S. screen.

2. The fabricated potato chip of claim 1, wherein said potato flakes comprise from about 45% to about 50% broken cells; from about 20% to about 27% amylose; from about 7% to about 8% moisture; and from about 0.2% to about 0.4% emulsifier.

3. The fabricated potato chip of claim 1, wherein said potato flakes have a water absorption index of from about 6.7 to about 9.5 grams of water per gram of flakes.

4. The fabricated potato chip of claim 1, wherein said potato flakes have a hot paste viscosity of from about 100 BU to about 320 BU.

5. The fabricated potato chip of claim 4, wherein said potato flakes have a hot paste viscosity of from about 240 BU to about 300 BU.

6. The fabricated potato chip of claim 4, wherein said potato flakes have a cold paste viscosity of from about 100 BU to about 230 BU.

7. The fabricated potato chip of claim 6, wherein said potato flakes have a hot paste viscosity of from about 240 BU to about 300 BU.

8. The fabricated potato chip of claim 7, wherein said potato flakes have a cold paste viscosity of from about 120 BU to about 220 BU.

9. The fabricated potato chip of claim 6, wherein said potato flakes have a hot paste viscosity of from about 275 BU to about 290 BU and a cold paste viscosity of from about 150 BU to about 210 BU.

10. The fabricated potato chip of claim 6, wherein said potato flakes are prepared from raw potatoes.

11. The fabricated potato chip of claim 1, wherein said potato flakes comprise from about 17% to about 20% amylose; and wherein said flakes are prepared from pre-conditioned potato pieces.

12. The fabricated potato chip of claim 11, wherein said potato flakes have a water absorption index of from about 7 to about 9 grams of water per gram of flakes.

13. The fabricated potato chip of claim 12, wherein said potato flakes have a hot paste viscosity of from about 100 BU to about 280 BU.

14. The fabricated potato chip of claim 13, wherein said potato flakes have a hot paste viscosity of from about 150 BU to about 250 BU.

15. The fabricated potato chip of claim 12, wherein said potato flakes have a cold paste viscosity of from about 100 BU to about 200 BU.

16. The fabricated potato chip of claim 15, wherein said potato flakes have a cold paste viscosity of from about 120 BU to about 180 BU.

17. The fabricated potato chip of claim 12, wherein said potato flakes have a hot paste viscosity of from about 190 BU to about 230 BU and a cold paste viscosity of from about 140 BU to about 160 BU.

18. The fabricated potato chip of claim 17, wherein said pre-conditioned pieces are selected from the group consisting of potato slabs, potato nubbins, potato slivers and mixtures thereof.

* * * * *